US006284357B1

(12) United States Patent
Lackey et al.

(10) Patent No.: US 6,284,357 B1
(45) Date of Patent: *Sep. 4, 2001

(54) LAMINATED MATRIX COMPOSITES

(75) Inventors: Walter J. Lackey, Marietta; Stuart R. Stock, Atlanta, both of GA (US)

(73) Assignee: Georgia Tech Research Corp., Atlanta, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/231,408

(22) Filed: Jan. 14, 1999

Related U.S. Application Data

(63) Continuation-in-part of application No. 08/709,483, filed on Sep. 6, 1996, now abandoned
(60) Provisional application No. 60/003,414, filed on Sep. 8, 1995.

(51) Int. Cl.[7] ........................................ B32B 18/00

(52) U.S. Cl. .................. 428/220; 428/293.4; 442/71; 427/249.1; 427/249.2; 427/249.3; 427/249.5; 427/249.15

(58) Field of Search .................. 428/220, 293.4; 442/59, 64, 71; 427/249.1, 249.2, 249.3, 249.5, 249.15

(56) References Cited

U.S. PATENT DOCUMENTS

| | | | |
|---|---|---|---|
| 4,668,579 | * 5/1987 | Strangman et al. | 428/367 |
| 5,079,039 | 1/1992 | Heraud et al. | 427/249 |
| 5,194,330 | 3/1993 | Vandenbulcke et al. | . |
| 5,246,736 | 9/1993 | Goujard et al. | 427/249 |

OTHER PUBLICATIONS

Phillipps, et al., "The Correlation of Interfacial and Macroscopic Toughness in SiC Laminates," Composites, 24(2) 166–176 (1993).

Phillips, et al., "Fracture Behaviour of Ceramic Laminates In Bending—II. Comparison of Model Predictions With Experimental Data" vol. 41, No. 3, pp. 819–827. 1993.

Whitehead, et al., "Non–Planar $Al_3O_2$/YPSZ Laminates By Electrophoretic Deposition Using A1203 Fiber Electrodes" Ceramic Engineering and Science Proceedings, pp. 1110–1117, 1994.

Diefendorf, et al., "Processing of Polymeric Precursor, Ceramic Matrix Composites" Mat. Res Soc. Symp. Proc., vol. 120. PP. 157–162, 1988.

Phillipps, et al., "The Modelling and Control of Failure In Bi–Material Ceramic Laminates," J. de Phys. IV, C7, Supplement III, 3 1875–81, Nov.,(1993).

Sanitarov, et al., Structure Property Relationships in Microlaiminate $TiC/TiB_2$ Condensates, Thin Solid Films. 97 pp. 215–219, 1982.

Marshall, et al., "Enhanced Fracture Toughness in Layered Microcomposites of $Ce-Zro_2$ and $Al_2O_3$," J. Am. Ceram. Soc., 74 (12) 2979–2987, (1991).

Lackey, et al., "Technique for Monitoring the Progression of Densification During Chemical Vapor Infiltration Processing of Composites," J. Am. Ceram. Soc., 78 (4) 1131–1133 (1995).

(List continued on next page.)

*Primary Examiner*—Elizabeth M. Cole
(74) *Attorney, Agent, or Firm*—Todd Deveau; Ryan A. Schneider; Troutman Sanders LLP

(57) ABSTRACT

A laminated matrix composite made of a reinforcement phase and coated with several layers of a metallic, ceramic, or polymeric matrix material, the average thickness of the layers of matrix material being between 0.005 and 5 μm thick.

26 Claims, 7 Drawing Sheets

Laminated matrix composite prepared by FCVI showing carbon fiber and alternating layers of carbon (dark) and SiC (light). Sample L-1.

OTHER PUBLICATIONS

Mazdiyasni, "Fiber Reinforced Ceramic Composites" Materials, Processing and Technology, pp. 397–449.

Vaidyaraman, et al., Forced Flow–Thermal Gradient Chemical Vapor Infiltration (FCVI) For Fabrication of Carbon/Carbon, Carbon vol. 33, No. 9, pp. 211–1215, 1995.

Vaidyaraman, et al., "Fabrication of Carbon—Carbon Composites By Forced Flow–Thermal Gradient Chemical Vapor Infiltration," J. Mater. Res., vol. 10, No. 6, pp. 1469–1477 Jun. 1995.

Clegg, et al., "A Simple Way To Make Tough Ceramics", Letters To Nature, vol. 347, pp. 455–457 (Oct. 1990).

Boisvert, et al., "Chemical Vapor Deposition Of Silicon Carbide Using Methyltrichlorosilane" Austceram 92 (Australian Ceramic Conference, 1992, Melbourne, Australia), pp. 487–493.

Caputo, A.J, et al. "Improvements in the Fabrication of Ceramic–Fiber–Ceramic–Matrix Composites by Chemical Vapor Infiltration," Oak Ridge National Laboratory, Oak Ridge, TN (Operated by Martin Marietta Energy Systems, Inc. for the U.S. Department of Energy), pp; 1–40; Jun. 1985.

Taylor, A.J. et al. "Pyrolytic Carbon Infiltration Studies," Union Carbide Corporation, Nuclear Division, Oak Ridge Y–12 Plant, Oak Ridge, TN (Operated for the Atomic Energy Commission under U.S. Government contract W–7405 eng 26), p. 68 (date unknown).

* cited by examiner

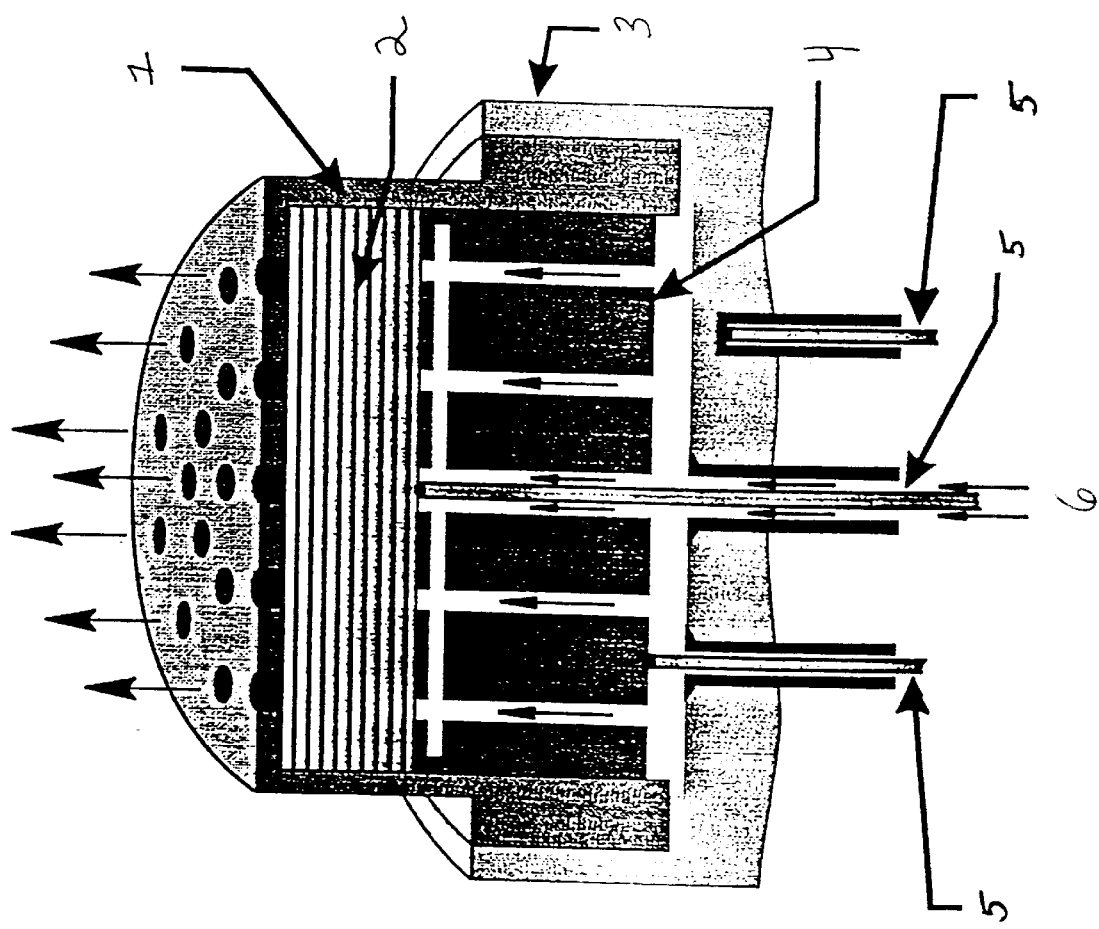
Figure 1. Schematic of FCVI process.

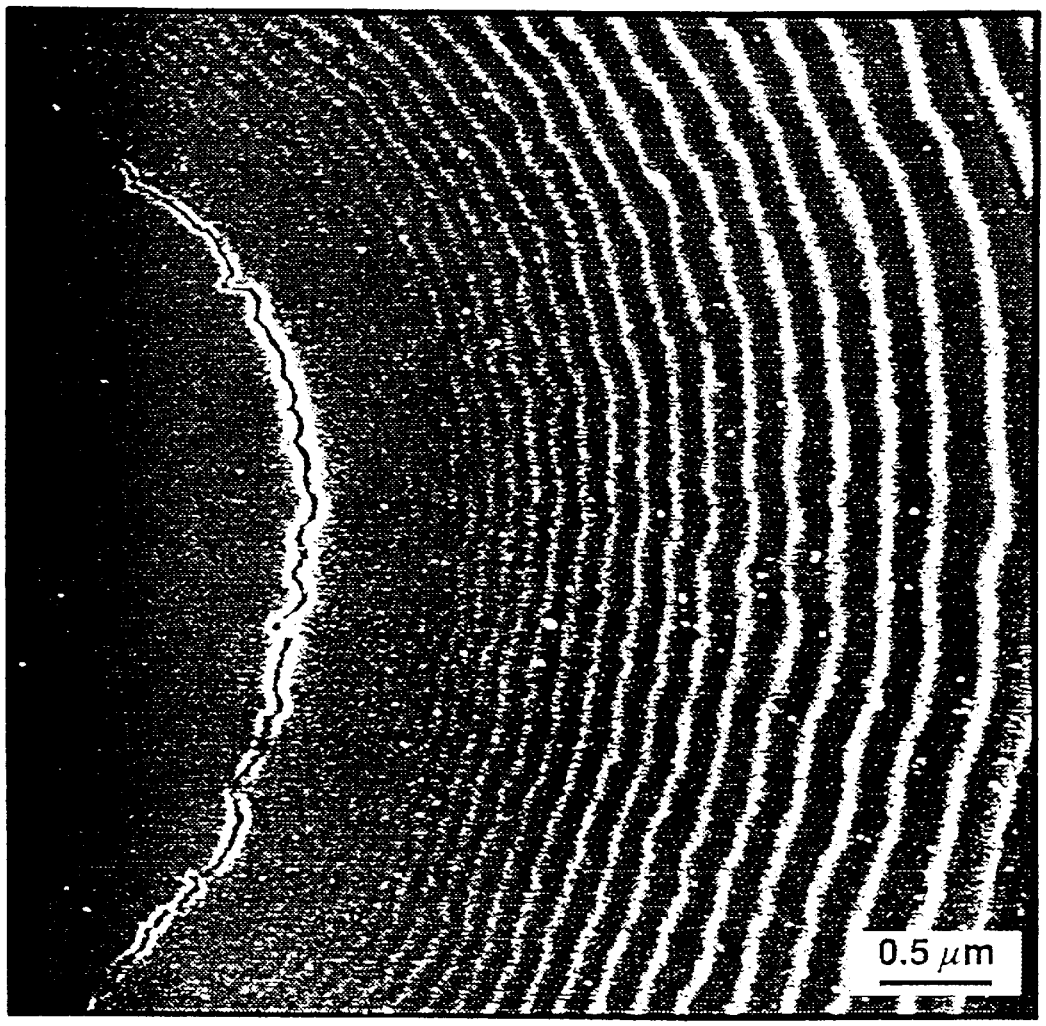
Figure 2. Laminated matrix composite prepared by FCVI showing carbon fiber and alternating layers of carbon (dark) and SiC (light). Sample L-1.

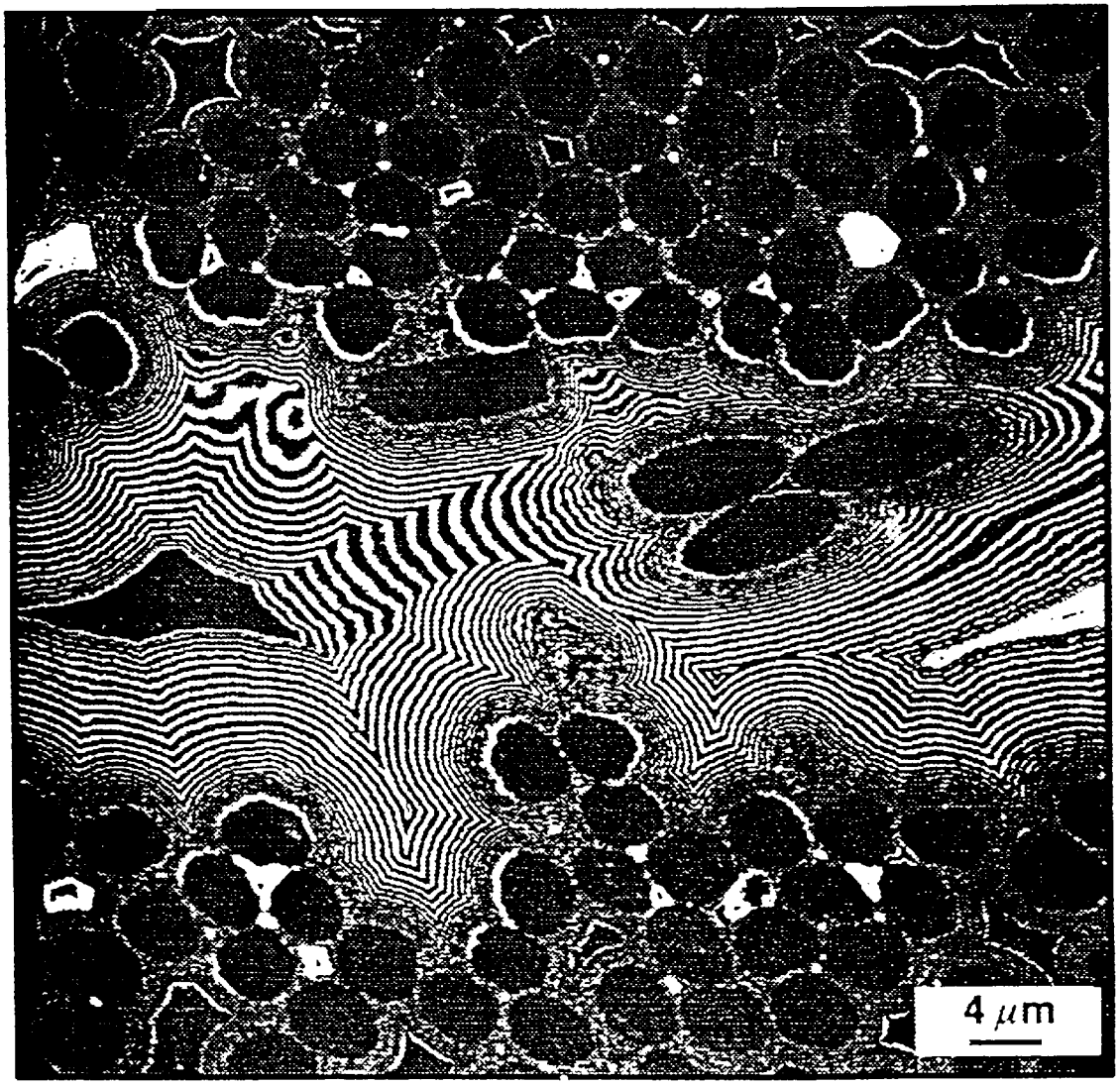
Figure 3. Laminated matrix composite sample L-3.

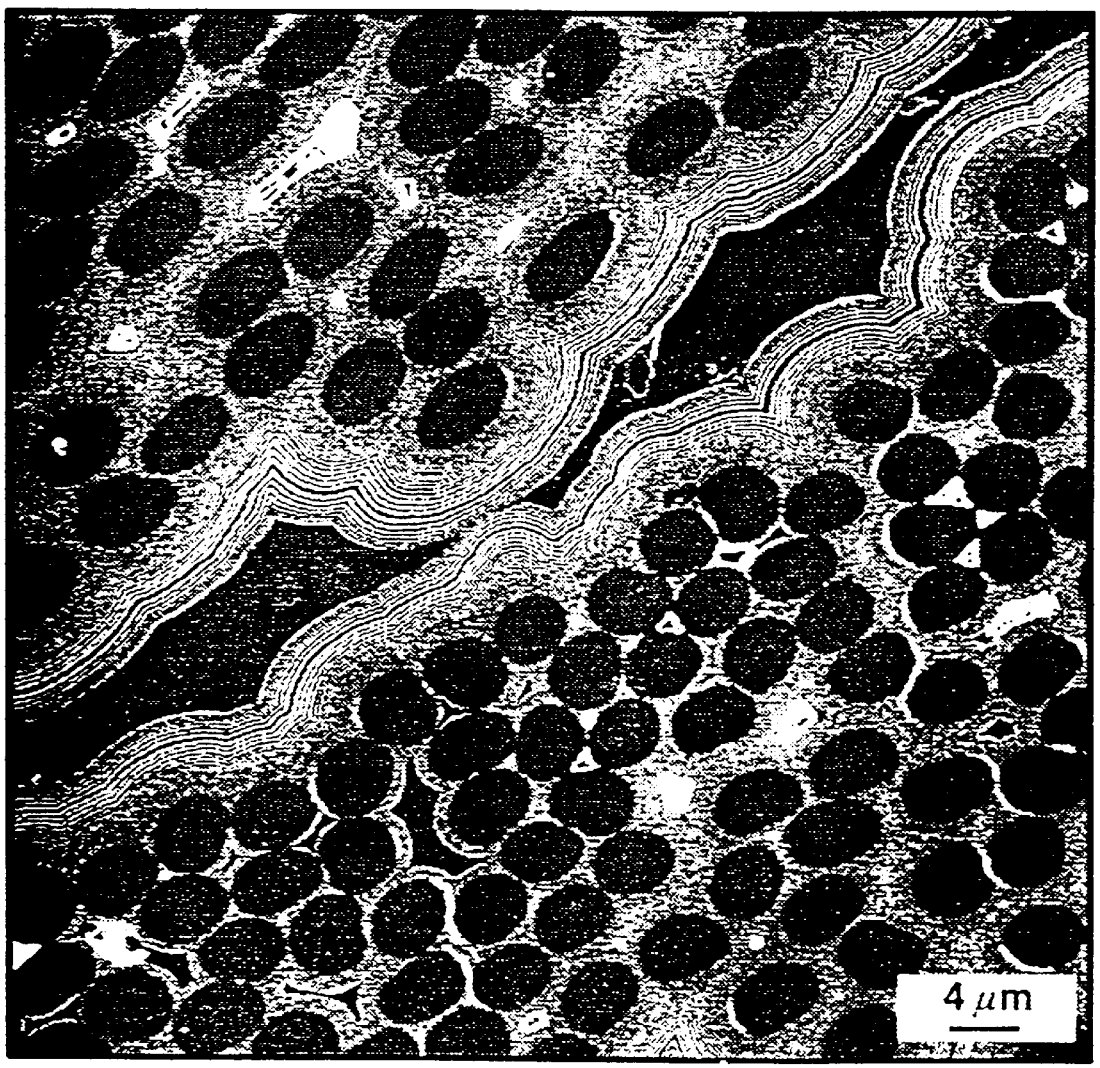
Figure 4. Laminated matrix composite sample L-5.

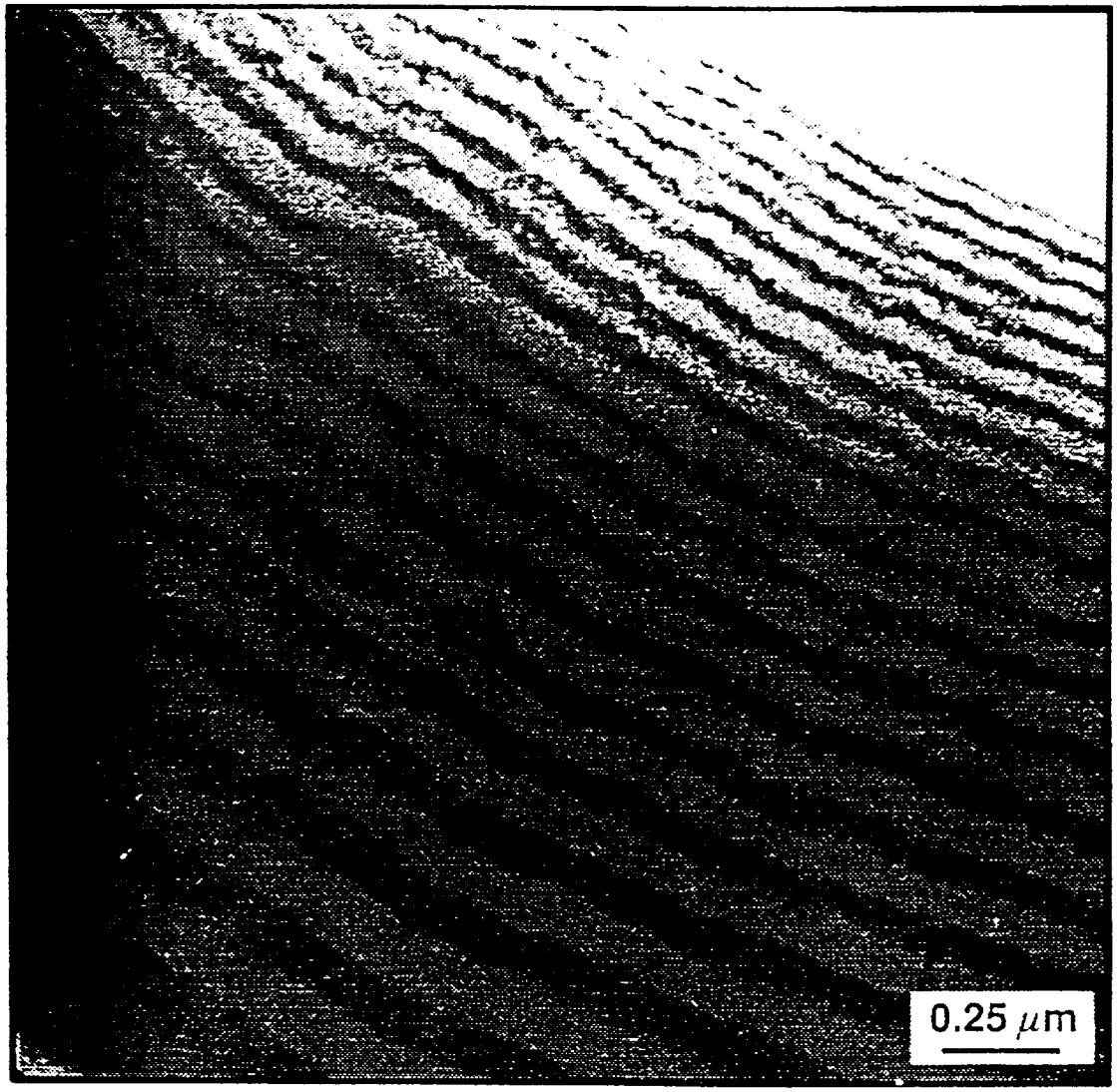
Figure 5. TEM of laminated matrix composite sample L-5.

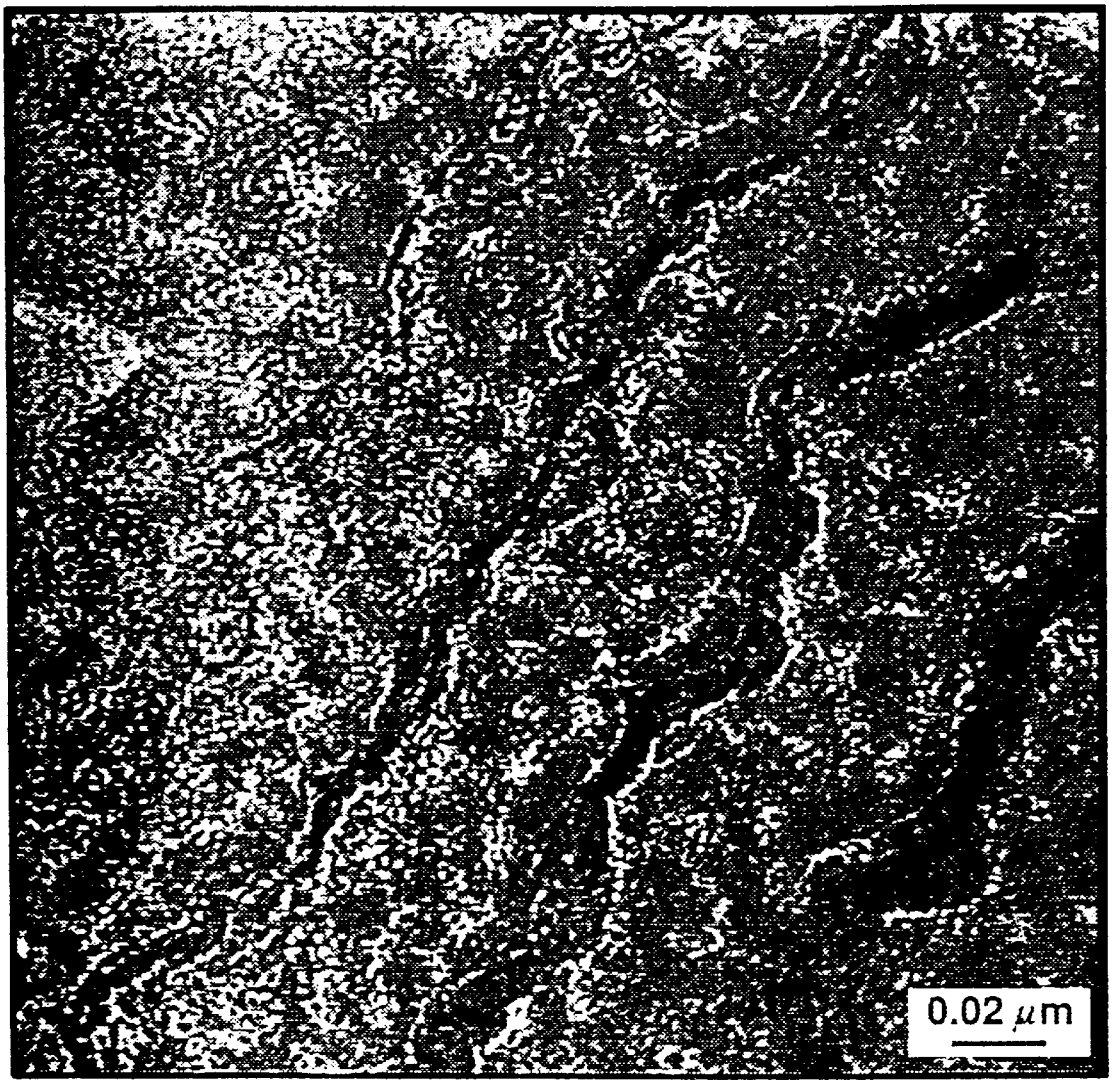
Figure 6. TEM of laminated matrix composite sample L-1.

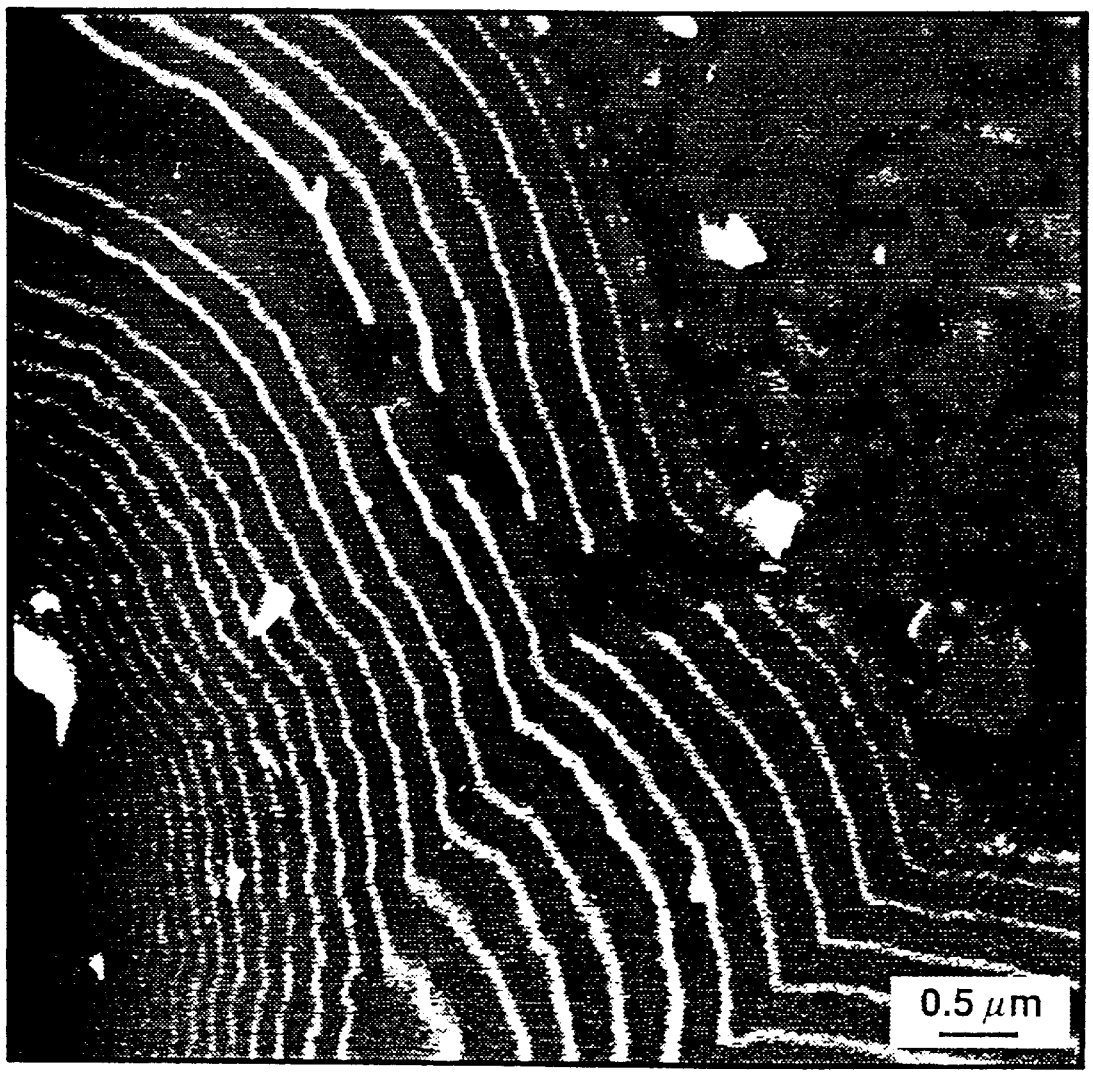
Figure 7. Deliberately fractured sample L-1-M-3 showing tortuous crack path.

LAMINATED MATRIX COMPOSITES

This application is a continuation-in-part of copending application Ser. No. 08/709,483, now abandoned filed Sep. 6, 1996, which is based upon provisional application Ser. No. 60/003,414 filed on Sep. 8, 1995.

This invention was made with government support under Contract No. DE-AC05-84OR21400 awarded by the Air Force Office of Scientific Research. The government has certain rights in this invention.

BACKGROUND OF THE INVENTION

1. Field of the Invention

This invention relates to laminated matrix composites, a new class of materials made with a CVI process comprising a reinforcement preform structure coated with multiple thin layers of a matrix material

2. Description of the Prior Art

It is well known that ceramics have, for certain applications, desirable properties, such as light weight, high stress, corrosion/wear resistance, and strength retention at high temperatures. In recent years, ceramics have been the focus of considerable attention for use in advanced energy conversion systems such as heat exchangers, gas turbines, and other heat engines. However, their brittleness limits their use in most structural applications. Metals, on so the other hand, have excellent toughness, but typical suffer from loss of strength at high temperatures, excessive creep, and high density. These shortcomings have been overcome for ceramics and metals using fibers or whiskers as reinforcement and also in metals using platelets and particulates. For example, the toughness of SiC and carbon have been improved by reinforcement with SiC and carbon fibers. Also, SiC fibers or platelets have been used to reinforce Ti, Al and other metals. In these prior examples, the matrix was either single phase or contained a dispersed phase.

It is also well known that the mechanical properties of structures can be enhanced by using alternate layers of two materials. Examples of such laminated materials include Ni/Cu, Fe/Cu, $ZrO_2/Al_2O_3$, SiC/C, TiC/TN, $TiC/TiB_2$, TiC/Ni $Al_2O_3$/Nb, and many others. Much of the work conducted on such structures shows that mechanical and tribological properties improve as layer thicknesses decrease. For some systems, properties show non-linear changes as layer thicknesses approach ~0.02 $\mu$m, i.e.; even more rapid improvement in properties with decreasing thickness. The high fracture toughness of mollusk shells (~10 Mpa•m½) is sometimes offered as an example of the potential of layered structures.

The approach of the prior work involving ceramic composites consisted of interspersing thick layers of ceramic with thin, less rigid layers of an interface material The vast majority of the matrix consisted of one phase, say SiC, which was partitioned into 3 to 5 thick layers by thin layers of an interface material such as carbon or BN. In these composites, the choice of matrix materials is limited to rigid ceramics and less rigid interface materials. Further, the layers of the ceramic material of these composites are in the order of several microns thick.

For example, U.S. Pat. No. 5,079,039, issued to Heraud. et al discloses a fiber preform densified by sequential depositions of thick layers of a rigid ceramic material interspersed with thin layers of either pyrolytic carbon or boron nitride. While some layers less than 2 $\mu$m thick are taught in Heraud, et al., the alternating layers are magnitudes greater in thickness, thereby yielding an average thickness which is magnitudes greater than 2 $\mu$m U.S. Pat. No. 5,246,736, issued to Goujard et al, discloses a similar composite coated with an oxidation-resistant coating of an Si-B-C system Additionally, many of the types of fibers used as structures reinforcement are easily damaged by high temperatures. Thus, the use of fibers as the reinforcement structure in the prior art has limited the processing temperatures of the coating process. The use of less temperature sensitive reinforcement structures would allow higher processing temperatures, and thus a more rapid process and a more economical composite. Further, several materials require higher processing temperatures and thus are not suitable as matrix materials.

Further, HCl which may be present in a CVD atmosphere reacts with some fiber reinforcement materials and degrades them just as high temperature would. Thus, the ability to use less-sensitive structures, such as platelets or particles, would be a significant advance in the art.

Chemical vapor deposition (CVD) is one of the most widely used deposition processes to coat surfaces. The conventional CVD process is based on thermochemical reactions such as thermal decomposition, chemical reduction, displacement and disproportionation reactions. CVD reaction products find applications in a wide variety of fields, such as providing hard coatings on cutting tools, protecting surfaces against wear, erosion, corrosion, high temperature oxdation, high temperature diffusion, solid state electronic devices, preparation of fibers for composite materials, and hermetic coatings.

Chemical vapor infiltration (CVI) is a specialized form of CVD. In the CVI process, a matrix is chemically vapor deposited wit a porous preform to produce a composite material. CVD, in general, results in the production of a coating, while CVI results in the production of a composite article. The preform, or reinforcement phase, may consist of particulates, fibers, or any other suitable constituents or materials which will form a porous medium The preform to be subjected to CVI is placed in a modified CVD reactor. Gaseous CVD reagents penetrate the pores of the preform and deposit onto the surfaces of the particles. As the deposition process continues, the particles are coated and grow, and consequently the spaces between the particles become smaller. Eventually, the particle coatings interlock and the particles are bonded together by the coating. This coating is the matrix, which, along with the original particles, constitutes the composite.

It would be a significant advance in the art to combine the advantages of fiber or particulate reinforcement and laminated structures. The resulting composite would have a reinforcement phase and a laminate structure. Laminated structures are typically fabricated by stacking foils, followed by hot pressing or diffusion bonding, various coating processing, sedimentation, centrifugation, and electrophoresis. These processes, however, do not lend themselves to the infiltration of fibrous or particulate preforms. Furthermore, several of the processes now known are not applicable to submicron thick layers because of difficulties with handling or limitations on the size of the constituents.

BRIEF SUMMARY OF THE INVENTION

The inventive composite consists of a reinforcement phase plus a laminated matrix composed of alternate layers of one or more different materials. Layered structures enhance mechanical toughness. Thus, their use as a matrix, along with the reinforcement phase, will enhance the toughness of the overall composite. Chemical vapor infiltration (CVI) is an appropriate process for the fabrication of this class of materials. The reinforcement can be felts, fibers, whiskers, platelets, or particulates, used individually or as a mixture. The matrix layers can be ceramic, metallic, or polymeric. The reinforcement materials are infiltrated with alternating layers of matrix with an average thickness no greater than about 5 μm The technique also may be used to produce optical devices such as optical wave guides.

It is an object of this invention to provide a composite reinforced with fibers, whiskers, platelets, or particles and thus, allowing higher processing temperatures.

It is a further object of this invention to provide a laminated matrix composite having superior mechanical properties by virtue of numerous thin matrix layers.

These objects, and other objects, features and advantages of this invention, will become more apparent to one skilled in the art when the following detailed description of the preferred embodiment is read in conjunction with the attached drawings.

BRIEF SUMMARY OF THE FIGURES

FIG. 1 is a schematic of the forced flow thermal gradient process of the present invention.

FIG. 2 is a micrograph of the laminated matrix composite of the present invention (Sample L-1).

FIG. 3 is another micrograph of the composite of the present invention (Sample L-3).

FIG. 4 is another micrograph of the composite of the present invention (Sample L-5).

FIG. 5 is a transmission electron micrograph of the laminated matrix composite of FIG. 4.

FIG. 6 is a transmission electron micrograph of the laminated matrix composite of FIG. 2.

FIG. 7 is a micrograph of a deliberately fractured laminated matrix composite of the present invention (Sample L-1-M-3).

DETAILED DESCRIPTION OF THE PREFERRED EMBODIMENT

In accordance with this invention, laminated matrix composites are disclosed. This novel class of materials consist of a reinforcement phase plus a matrix composed of alternating thin layers of matrix materials.

The present invention, in a sense, represents a paradigm shift away from the thick-ceramic/thin-interface layered composites of the prior art. The novel composites of the present invention have very thin layers of a much broader range of matrix materials. These composites exhibit novel or greatly improved properties and allow custom engineering of the composites to obtain specific mechanical, chemical, thermal, optical, and electrical properties not obtainable in previous composites.

Reinforcement materials can be fibers, felts, whiskers, platelets, or particulates, or equivalent materials, used individually, or as a mixture. Additionally, if fibers are used, the fibers may be unidirectional or woven into 2-D or 3-D fabric or structures. The composition of the reinforcement can be metallic, ceramic, or polymeric; preferably, the reinforcement is a carbon, silicon carbide (SiC), $ZrO_2$, $Al_2O_3$, TiSiC compound mixtures, or hibonite- and monazite-like oxidation resistant compound. Two-dimensional woven fabric lay-ups are preferred. However, if the laminated matrix is sufficiently effective in inducing crack deflection in branching for a particular application, fiber reinforcement may not be required. In this case, particles or platelets, rather than fibers, may be economically preferred.

When using fibers, the maximum process temperature is limited to ~1200° C. in order to prevent damage to the fibers. The use of particles or platelets permits faster, less expensive, composite fabrication since higher processing temperatures above 1200° C. may be used. Both faster processing and avoiding the use of expensive fibers significantly reduces the cost of composites. For example, the least expensive SiC fiber currently sells for about $300/lb; whereas, SiC particulate is available in a wide range of sizes for about $1–2/lb. Additionally, some matrix materials, such as crystalline silicon nitride, require much higher processing temperatures than a fiber reinforcement phase would allow. In such a case, the use of whiskers, platelets, or particles would be particularly advantageous.

The laminated matrix class of composites offers other advantages such as greater isotropy in mechanical properties. Also, in the case of carbon-carbon composites, the poor oxidation resistance would by improved by a matrix comprised of layers of carbon and SiC or carbon and $B_{13}C_2$. Further, by selection of materials with appropriate coefficients of thermal expansion and by adjustment of layer thicknesses, the laminated matrix concept permits tailoring of the thermal expansion of the matrix. This offers the benefit of matching the thermal expansion of the composite with that of an externally applied protective coating. Similarly, thermal conductivity also can be tailored. For example, the use of multiple thin layers greatly retards heat transfer by the composite.

The matrix materials can be metals, ceramics, or polymers. Suitable matrix materials are carbon, carbides, borides, oxides, nitrides, or silicides, SiC, $Si_3N_4$, $Al_2O_3$, stabilized ZrO2, $B_{13}C_2$, BN, Nb metal, nickel, rhenium, TiC, $HfB_2$, ZrO2, TiSiC compound mixtures, TiGeC compound mixtures, $MoSi_2$, and hibonite and monazite-ike compounds. The preferred matrix is composed of alternating thin layers of carbon and SiC. By "nonazite-like" it is meant to denote mineral compounds with a structure similar to that of monazite and obtained through substitution of any of the rare earth metals for cerium.

The composites of the present invention are not limited to those with alternating layers of two materials. Alternating layers of three or more materials may be utilized to obtain the desired composite. For example, the composites of the current invention may have alternating layers of three different materials, such as a metal, a ceramic, and a polymer. Likewise, a layer may be composed of mixtures of suitable matrix materials.

Additionally, it is w the scope of this invention to produce a composite having layers of only one matrix material with alternating layers being different in at least property. For example, one skilled in the art may design a composite having alternating layers of dense SiC and porous SiC.

Lower processing temperatures may be required when using laminated polymer layers or a polymeric reinforcement phase. Suitable low-temperature coating processes, such as plasma enhanced CVD, or deposition processes using metalo-organic reagents are known in sit the art. Further, if a polymer layer is to be used, it may be preferable to select other matrix materials that have lower processing temperatures themselves, so as to not damage the polymer coating during deposition.

The matrix material layers are between about 0.005 μm and about 5 μm. The layers are preferably between about 0.005 μm and about 1.0 μm; most preferably between about 0.005 μm and 0.5 μm.

Each layer interface presents a barrier to crack propagation because it requires energy for the crack to propagate through any layer interface. Thus, the resistance of the composite to crack propagation increases with the number of layers, making it advantageous to deposit as many layers in the available space as possible. Because space between the fibers is finite, the number of layers deposited when vary in relation to the thickness of the layers. Typically, enough layers will be deposited to form a laminated matrix coating of 30–200 μm, as this is usually the maim amount of space available between fibers. Thus, the inclusion of thick (i.e., >5 μm) layers as taught in the prior art can dramatically reduce the number of layers that can be placed in this limited space. Therefore, it is advantageous to keep the average thickness of the layers below about 5 μm Preferably, the average thickness of the layers is between about 0.005 μm and about 1.0 μm; most preferably between about 0.005 μm and about 0.5 μm. Having an average thickness between these ranges maximizes the number of layers, and thus, the mechanical properties or toughness of the composite. By "average," it is simply meant the arithmetic mean calculated by dividing the sum of layer thicknesses by the number of layers.

A further embodiment of the present invention is a laminated matrix composite consisting essentially of a reinforcement phase, and a plurality of layers of two or more matrix materials, wherein each layer is between 0.005 μm and 5 μm thick. By "consisting essentially of;" it is not meant to exclude additions which do not change the character of the invention; but, rather, is meant to exclude composites having layers greater than 5 μm in thickness.

In choosing a combination of reinforcement and matrix materials, the desired elastic modulus, yield point, ductility, coefficient of thermal expansion, debonding, hardness, oxidation resistance, and layer thickness of the final composite should be considered. By selecting different combinations of the reinforcement and the matrix materials, a custom composite can be fabricated having the desired mechanical and physical behavior. To illustrate the utility of laminated matrix composites, several examples are set forth in Table I. A comparison of the elastic modulus and coefficient of thermal expansion of the two matrix materials is included for each composite.

TABLE I

Examples of Laminated Matrix Composite Systems

| | | Comparison of Matrix Materials | |
|---|---|---|---|
| Type Reinforcement | Matrix Materials | Elastic Modulus | Coefficients of Thermal Expansion |
| 1. Carbon Fiber | C and SiC | Large Difference | Similar |
| 2. Carbon Fiber | SiC and $Si_3N_4$ | Similar | Similar |
| 3. SiC Fiber | C and SiC | Large Difference | Similar |
| 4. SiC Fiber | SiC and $Si_3N_4$ | Similar | Similar |
| 5. SiC Particles | C and SiC | Large Difference | Similar |
| 6. SiC Particles | SiC and $Si_3N_4$ | Similar | Similar |
| 7. SiC Platelets | C and SiC | Large Difference | Similar |
| 8. SiC Platelets | SiC and $Si_3N_4$ | Similar | Similar |
| 9. $Al_2O_3$ Fibers | SiC and $Si_3N_4$ | Similar | Similar |
| 10. $Al_2O_3$ Fibers | Nb and $Al_2O_3$ (or SiC) | Large Difference | Large Difference |

TABLE I-continued

Examples of Laminated Matrix Composite Systems

| | | Comparison of Matrix Materials | |
|---|---|---|---|
| Type Reinforcement | Matrix Materials | Elastic Modulus | Coefficients of Thermal Expansion |
| 11. $Al_2O_3$ Particles or Platelets | SiC and $Si_3N_4$ | Similar | Similar |
| 12. $ZrO_2$ Particles or Platelets | SiC and $Si_3N_4$ | Similar | Similar |

Alternative refractory reinforcement materials could include whiskers, microspheres, elongated particulates, and mixtures of these with or without continuous or chopped fibers. The reinforcement constituents could be solid, hollow, or porous. Obviously, fiber compositions other than those given in the table could be used.

With any of the systems, interface coatings may be used on the reinforcement and between matrix layers, if desired. Materials such as C, BN, TiSiC compounds, $LaPO_4$, $LaAl_{11}O_{18}$, calcium aluminates, and others that have layered, easily cleaved crystal structures are candidate interface materials.

Referring to FIG. 1, in the process of fabricating the composites of this invention, a pressure gradient forces the reagent stream 6 to flow through a preform 2 which is subjected to a temperature gradient measured by thermocouples 5. The preform can consist of numerous layers of carbon cloth oriented at various rotational angles to each other. The layers are stacked in a preform holder 1 and compacted so that fibers comprise from 5%–70% of the total volume, and preferably from 40%–50%. While graphite is the preferred material for the preform holder, it may not be suitable when an oxide is being deposited because an oxygen-containing environment would damage the graphite holder. In such a case, an Inconel or SiC holder may be preferred. The preform can be extended several centimeters above the gas injector to influence the temperature and temperature gradient through the preform 2. For example, in one situation the temperature difference between the hot and cold sides of a preform extended 5.1 centimeters above the gas injector is 350° C., while extending it 7.6 centimeters results in a temperature difference of 150° C.

In this manner, layers from about 0.005 μm to about 5 μm, preferably about 0.005 μm to about 0.5 μm, are deposited on the reinforcement phase. The composite shows dramatically improved mechanical properties as the layer thickness approaches 0.02 μm. The reagent stream 6 is alternated to achieve layers of different materials on the reinforcement phase, thus creating the alternating layers. Each layer can be a different thickness, if desired, by decreasing or increasing the deposition or infiltration time or altering reagent flow rates and concentrations, temperature, and pressure.

The final reinforcement phase volume (loosely referred to as "fiber volume") of the novel composites of this invention is from 5%–70% of the total. Preferably, fiber volume is between 40%–50%. The use of a felt reinforcement phase will typically result in a final fiber volume of 5–10%, while using a woven 2-D lay-up or a 3-D woven structure will result in a fiber volume of 40–70%. The initial compression of the reinforcement phase in the preform holder before densification also win affect the final fiber volume.

EXAMPLE I

The operating conditions for the infiltration experiments are given in Table II. A thin carbon interface was deposited before the deposition of the laminated matrix. The interface was deposited by flowing 40 cm³/min of methane and 160 cm³/min of hydrogen through the preform for 20 minutes. The temperature of the bottom of the preform during the interface deposition was ~975° C. This step was followed by deposition of C and SiC, alternately. Carbon was deposited from a reagent mixture containing 50% propylene-50% hydrogen and the total flow rate was 400 cm³/min. The SiC layers were deposited using 50 cm³/min of methyltichlorosilane (MTS) and 500 cm3/min of hydrogen. The deposition time for each laminate layer was 5 min except for I-5 (FIG. 4), where each SiC layer was deposited for 10 min. Two infiltration runs (L-2 and-6) were conducted using only a carbon matrix for the purpose of comparison with the laminated matrix composites (LMCs).

The temperature of the bottom of the preform during the course of depositing the laminated matrix fluctuated between 900 and 961° C. This temperature variation was caused by changing the reagent stream, thereby altering the thermal conductivity of the gas between the water cooled gas injector and the preform The thermal conductivity of the propylene/hydrogen mixture was lower than that of the MTS/hydrogen mixture for the concentrations used in the present example. Consequently, the temperature increased when the propylene/hydrogen mixture was used as the reagent, and the temperature decreased when the reagent was changed to MTS/hydrogen. About 60 s elapsed between ending the deposition of one layer and starting the deposition of the next layer. During this interval, hydrogen was flowed through the composite.

The apparent volume of the composite was determined using Archimedes' principle with methanol ($\rho$=0.79 g/cm³). The open pore volume was calculated by weighing the composite saturated with methanol These two values were added to obtain the bulk volume. To calculate total porosity it was assumed that the densities of the deposited carbon and SiC were 1.9 and 3.2 g/cm³ respectively, and that the volume of carbon deposited was twice that of the SiC deposited.

TABLE II

Processing conditions for laminated matrix composites

| Run Number | Preform Type | Temperature of Preform Bottom (° C.) | Carbon Deposition Time per Cycle (mins) | SiC Deposition Time per Cycle (mins) |
| --- | --- | --- | --- | --- |
| L-1 | 3 | 910–950 | 5 | 5 |
| L-2 | 3 | 915–954 | — | — |
| L-3 | 2 | 900–961 | 5 | 5 |
| L-5 | 3 | 910–959 | 5 | 10 |
| L-6 | 2 | 900–967 | — | — |

The infiltration time, density, and porosity of the laminated matrix composites (L,1,-3 and -5), and carbon matrix composites (L-2 and -6) used as controls, are given in Table III.

The infiltration time for the laminated composites was 4.5–8 h versus 4 h for the carbon matrix composites. This is the result of SiC deposition being slower than carbon deposition for the conditions used. The open porosity of the laminated matrix and carbon matrix samples were similar.

TABLE III

Properties of the infiltrated composites

| Run Number | Fiber Content (v/o) | Total Number of Cycles | Infiltration Time (h) | Weight Gain (h) | Bulk Density (g/cm³) | Total Porosity (%) | Open Porosity (%) |
| --- | --- | --- | --- | --- | --- | --- | --- |
| L-1 | 50.6 | 40 | 6.67 | 12.90 | 1.672 | 16.4 | 5.94 |
| L-2 | 49.0 | — | 4.25 | 11.74 | 1.658 | 9.2 | 4.97 |
| L-3 | 56.7 | 27 | 4.50 | 14.74 | 1.700 | 13.7 | 5.56 |
| L-5 | 51.8 | 32 | 8.00 | 12.88 | 1.647 | 17.7 | 8.90 |
| L-6 | 50.8 | — | 3.60 | 13.11 | 1.692 | 7.6 | 7.57 |

Scanning electron microscopy showed that the desired laminated matrix composites were achieved in each case (FIGS. 2–5). Both the C and SiC layers were generally continuous with the exception of the first few layers in sample L-3 (FIG. 3). Transmission electron microscopy and electron diffraction verified that the deposits were turbostratic carbon and crystalline SiC. The number of layers at a given location depended on the space between the fibers. In a cloth lay-up, the distance between the fibers within a tow was 2–3 $\mu$m (micropores) and the distance between the tows was 50–100 $\mu$m (macropores). The tows became infiltrated early in the infiltration process and most of the infiltration time was spent on filing the macropores found between the cloth layers and tows within a cloth Hence, all layers were not observed within a tow (FIG. 4). However, all the layers were observed in the matrix deposited within the macropores (FIGS. 2 and 3).

As shown in FIGS. 2–4, layers of C and SiC averaging <0.5 $\mu$m thickness were achieved. The thickness of the deposited layers generally increased with increasing distance from the fiber surface during the deposition process. The thickness of the initial layers was as small as 0.01 $\mu$m and increased to ~0.5 $\mu$m near the end of the deposition process. However, it can easily be seen that the average thickness was below 0.5 $\mu$m in each case. The increase in the deposition rate, i.e. layer thickness, with infiltration time was caused by reduction of reagent depletion during the infiltration process. The term "regent depletion" refers to the reduction in concentration of the reagent as the process gas stream traverses the preform. Initially the reagent depletion was very high due to the high surface area of the preform, but since infiltration isolates an ever increasing number of tows, the surface area of the preform gradually reduces. This reduction in surface area, in turn, reduces reagent depletion and thereby leads to the observed increase in layers thickness with time. The increase in layer thickness is easily remedied by adjustment of deposition time or reagent concentration and flow rate and temperature gradient.

Several samples were deliberately fractured in order to observe, via SEM, the crack path. As shown in FIG. 7, evidence that the laminate layers offer resistance to crack propagation is seen. The crack shown here does not propagate in a straight line, but instead follows a torturous path with jogs occuring form one laminate layer to an adjacent layer. Typical debonding at the fiber-matrix interface was also observed.

In this specification, there is shown and described only the preferred embodiment of the invention, but, as aforementioned, it is to be understood that the invention is capable of use in various other combinations and environments and is capable of changes or modifications within the spirit and scope of the invention.

What is claimed is:

1. A laminated matrix composite comprising:
   (a) a reinforcement phase; and
   (b) a plurality of layers of at least one material deposited on said reinforcement phase, wherein each layer has an arithmetic mean thickness of less than 0.5 $\mu$m.

2. A laminated matrix composite as claimed in claim 1, wherein the structure of reinforcement phase is selected form the group consisting of felts fibers, whiskers, platelets, particulates, and mixtures thereof.

3. A laminated matrix composite as claimed in claim 2, wherein said matrix materials selected from the group consisting of metals, ceramics, and polymers.

4. A laminated matrix composite as claimed in claim 3, wherein said matrix materials are selected from the group consisting of carbon, SiC, $Si_3N_4$, $Al_2O_3$, stabilized $ZrO_2$, $B_{13}C_2$, BN, Nb metal, nickel, rhenium, TiC, $HfB_2$, $ZrO_2$, TiSiC compounds, TiGeC compounds, $MoSi_2$, and mixtures thereof.

5. A laminated matrix composite as claimed in claim 4, wherein said matrix materials are selected from the group consisting of SiC and carbon.

6. A laminated matrix composite as claimed in claim 2, wherein said reinforcement phase is selected from the group consisting of metals, ceramics, and polymers.

7. A laminated matrix composite as claimed in claim 6, wherein said reinforcement phase is selected from the group consisting of carbon, SiC, $Al_2O_3$, $ZrO_2$, and mixtures thereof.

8. The laminated matrix composite as claimed in claim 1, wherein there is a difference in the elastic moduli of said layer materials.

9. The laminated matrix composite as claimed in claim 1, wherein the elastic moduli of said layer materials are about the same.

10. The laminated matrix composite as claimed in claim 1, wherein there is a difference in the coefficients of thermal expansion of said layer materials.

11. The laminated matrix composite as claimed in claim 1, wherein the coefficients of thermal expansion are about the same.

12. The laminated matrix composite as claimed in claim 1 wherein the reinforcement phase is between about 40% and about 50% of the total volume of said composite.

13. A laminated matrix composite as claimed in claim 1, wherein at least one layer comprises at least one interface coating.

14. A laminated matrix composite as claimed in claim 13, wherein said interface coating is selected from the group consisting of carbon, BN, $LaPO_4$, $LaAl_{11}O_{18}$, calcium aluminates, and mixtures thereof.

15. A laminated matrix composite comprising:
    (a) a reinforcement phase; and
    (b) a plurality of layers of two matrix materials, wherein the arithmetic mean of the thicknesses of said layers is between 0.005 $\mu$m and 0.1 $\mu$m, and wherein each of said matrix materials is alternated so that each layer is of a different composition than any adjacent layer.

16. A process for producing a laminated matrix composite comprising the steps of
    (a) forming a reinforcement phase; and
    (b) successively coating said reinforcement phase with a plurality of layers of two or more matrix materials, wherein the arithmetic mean of the thicknesses of said layers is between about 0.005 $\mu$m and about 0.1 $\mu$m.

17. A process as claimed in claim 16, wherein said step of coating is achieved by CVD.

18. A process as claimed in claim 17, wherein said step of coating is achieved by forced-flow thermal gradient CVI.

19. A laminated matrix composite consisting essentially of:
    (a) a reinforcement phase; and
    (b) a plurality of layers of at least two materials deposited on said reinforcement phase, wherein each of said layers is less than 0.5 $\mu$m thick.

20. A laminated matrix composite as claimed in claim 19, wherein said layers are between about 0.005 $\mu$m and about 0.5 $\mu$m thick.

21. A laminated matrix composite consisting essentially of:
    (a) a reinforcement phase; and
    (b) a plurality of layers of two matrix materials each between about 0.005 $\mu$m and about 0.1 $\mu$m thick, wherein each of said matrix materials is alternated so that each layer is of a different composition than any adjacent layer.

22. A laminated matrix composite consisting essentially of:
    (a) a reinforcement phase; and
    (b) a plurality of layers of at least two materials deposited on said reinforcement phase, wherein each of said layers is less than 0.5 $\mu$m thick, and wherein each of said materials alternated so that each layer is a different composition than any adjacent layer.

23. A laminated matrix composite consisting essentially of:
    (a) a reinforcement phase; and
    (b) a plurality of layers of at least two materials deposited on said reinforcement phase, wherein each of said layers is less than 0.5 $\mu$m thick, and wherein each of said materials alternated so that each layer has a different property than any adjacent layer.

24. The composite of claim 1, wherein the plurality of layers has a combined thickness between 0.005 $\mu$m and 200 $\mu$m.

25. The composite of claim 19, wherein said materials are selected from the group consisting of silicon carbide and carbon.

26. A laminated matrix composite comprising:
    (a) a reinforcement phase; and
    (b) a plurality of layers of at least one material deposited on said reinforcement phase, wherein each layer has an arithmetic mean thickness of about to 1.0 $\mu$m or less; and
    (c) wherein the material is not silicon carbide or boron carbide.

* * * * *